United States Patent
Kanak et al.

(10) Patent No.: US 12,192,288 B2
(45) Date of Patent: Jan. 7, 2025

(54) PROACTIVE INDICATION OF NETWORK SESSION DISRUPTION

(71) Applicant: Cisco Technology, Inc., San Jose, CA (US)

(72) Inventors: Ather Sayeed Kanak, Fremont, CA (US); Renhua Wen, San Ramon, CA (US); Vaibhav Lade, Frisco, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 177 days.

(21) Appl. No.: 17/490,154

(22) Filed: Sep. 30, 2021

(65) Prior Publication Data

US 2023/0096435 A1   Mar. 30, 2023

(51) Int. Cl.
*H04L 67/141* (2022.01)
*G06F 3/06* (2006.01)

(52) U.S. Cl.
CPC .......... *H04L 67/141* (2013.01); *G06F 3/0604* (2013.01); *G06F 3/0655* (2013.01); *G06F 3/067* (2013.01)

(58) Field of Classification Search
CPC ... H04L 67/141; G06F 3/0604; G06F 3/0655; G06F 3/067
See application file for complete search history.

(56) References Cited

U.S. PATENT DOCUMENTS

| | | | | |
|---|---|---|---|---|
| 11,368,994 B1* | 6/2022 | Robinson | ............ | H04W 12/08 |
| 11,553,028 B1* | 1/2023 | Evans | ................ | H04L 65/80 |
| 2007/0091902 A1* | 4/2007 | Stewart | ................ | H04L 61/255 370/389 |
| 2012/0014488 A1* | 1/2012 | Liu | ................ | H04W 76/18 375/359 |
| 2013/0117347 A1* | 5/2013 | Yamauchi | ............ | G06F 12/1416 709/201 |
| 2015/0181467 A1* | 6/2015 | Bindrim | ................ | H04L 45/308 370/235 |
| 2015/0282029 A1 | 10/2015 | Faccin et al. | | |

(Continued)

FOREIGN PATENT DOCUMENTS

WO    2020206166 A1    10/2020

OTHER PUBLICATIONS

R. Stewart, et al. "Stream Control Transmission Protocol," Network Working Group, Request for Comments: 2960, Category: Standards Track, Oct. 2000, 134 pages.
R. Stewart, Ed., "Stream Control Transmission Protocol," Network Working Group, Request for Comments: 4960, Obsoletes: 2960, 3309, Category: Standards Track, Sep. 2007, 152 pages.

(Continued)

*Primary Examiner* — Michael A Keller
*Assistant Examiner* — Thao D Duong
(74) *Attorney, Agent, or Firm* — Edell, Shapiro & Finnan, LLC (57) ABSTRACT

Techniques are described for providing a proactive indication of a disruption of a network session. In one example, a network session is established between a first endpoint and a second endpoint based on a connection-oriented protocol. One or more network attributes associated with the network session are stored in a persistent storage. The one or more network attributes may be obtained from the persistent storage when the network session is disrupted. A proactive indication that the network session has been disrupted may be provided to the second endpoint based on the one or more network attributes.

20 Claims, 6 Drawing Sheets

(56) References Cited

U.S. PATENT DOCUMENTS

| | | |
|---|---|---|
| 2016/0255544 A1 | 9/2016 | Watfa et al. |
| 2016/0366571 A1* | 12/2016 | Payne .................. H04W 76/19 |
| 2019/0052711 A1* | 2/2019 | Kharlanau .......... H04L 67/1061 |
| 2019/0163576 A1* | 5/2019 | Compton ............. G06F 11/1469 |
| 2019/0208563 A1* | 7/2019 | Zee ....................... H04W 80/12 |
| 2020/0236055 A1 | 7/2020 | Warnicke et al. |
| 2020/0252265 A1* | 8/2020 | Ganu .................... H04W 24/08 |
| 2021/0136844 A1 | 5/2021 | Zee et al. |
| 2022/0200883 A1* | 6/2022 | Zhang .................. H04L 67/535 |
| 2022/0217225 A1* | 7/2022 | Gupta .................. H04L 43/028 |
| 2022/0272568 A1* | 8/2022 | Lee ................... H04W 52/0274 |
| 2022/0353888 A1* | 11/2022 | Sanders ............ H04W 72/1273 |
| 2023/0153045 A1* | 5/2023 | Otaka .................... H04W 4/80 |
| | | 358/1.15 |

OTHER PUBLICATIONS

"Connection-oriented communication," Wikipedia, https://en.wikipedia.org/wiki/Connection-oriented_communication, Apr. 19, 2021, 4 pages.

Brad Penoff, et al., "Towards MPI progression layer elimination with TCP and SCTP," ResearchGate, https://www.researchgate.net/publication/232622059, Apr. 2006, 60 pages.

"Connection-Oriented Protocol (COP)," Techopedia, https://www.techopedia.com/definition/27206/connection-oriented-protocol-cop, retrieved Sep. 9, 2021, 9 pages.

Werner Almesberger, "TCP Connection Passing," Linux Symposium, vol. One, 2004, 16 pages.

"Multihoming," Transport Manager, https://docs.oracle.com/cd/E57516_01/docs.70/Transport_Manager/concepts/c_transport_mgr_multihoming.html, retrieved Sep. 29, 2021, 1 page.

* cited by examiner

PROACTIVE INDICATION OF NETWORK SESSION DISRUPTION

TECHNICAL FIELD

The present disclosure relates to computer networking.

BACKGROUND

A connection-oriented protocol is a type of networking protocol that establishes a network session between peer connection endpoints and allows the endpoints to exchange data over the network session. Conventionally, one of the peer connection endpoints is called a server, and the other peer connection endpoint is called a client. In most cases, the server is stationary and is hosted at a certain address or location and the client has the ownership to discover the server and connect or even re-connect upon connection disruption. One example of a connection-oriented protocol is Stream Control Transmission Protocol (SCTP). SCTP is a reliable transport protocol that supports multiple streams per network session. In SCTP, a network session is referred to as an "association."

DESCRIPTION OF EXAMPLE EMBODIMENTS

Overview

Techniques are described herein for providing a proactive indication of a disruption of a network session. In one example embodiment, a network session is established between a first endpoint and a second endpoint based on a connection-oriented protocol. One or more network attributes associated with the network session are stored in a persistent storage. The one or more network attributes may be obtained from the persistent storage when the network session is disrupted. A proactive indication that the network session has been disrupted may be provided to the second endpoint based on the one or more network attributes.

Example Embodiments

Figure 1:
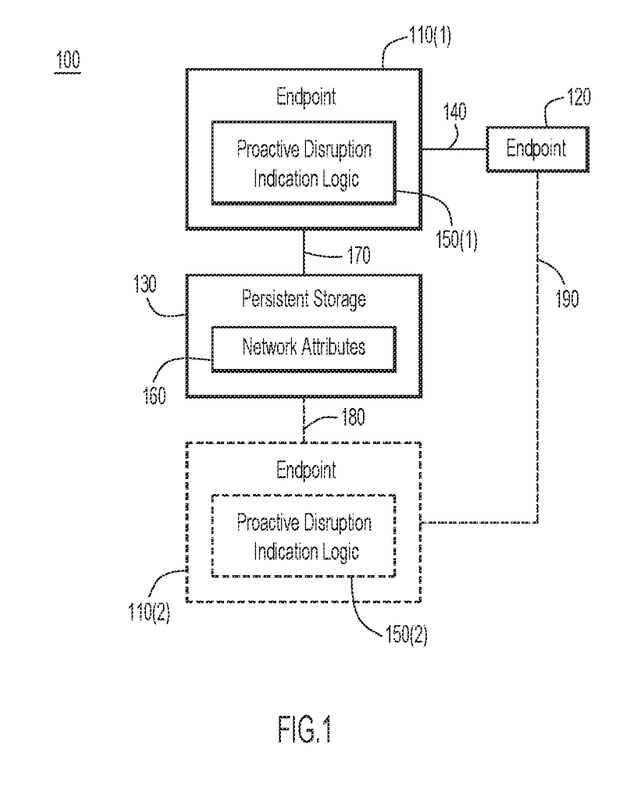
FIG. 1 illustrates a system configured to provide a proactive indication of a disruption of a network session between two endpoints, according to an example embodiment.

FIG. 1 illustrates an example system 100 configured to provide a proactive indication of a disruption of a network session. System 100 includes endpoint 110(1) and, optionally, endpoint 110(2). System 100 further includes endpoint 120 and persistent storage 130.

Endpoint 110(1), endpoint 110(2), and endpoint 120 may be any suitable endpoints configured to establish a network session based on a connection-oriented protocol (e.g., Stream Control Transmission Protocol (SCTP). For instance, endpoint 110(1) and endpoint 110(2) may be respective server processes and endpoint 120 may be a client. In the case of SCTP, endpoint 110(1) and endpoint 110(2) may be respective Packet Core Gateways (PCGWs) and endpoint 120 may be a Radio Access Network (RAN) node. Other embodiments may be envisioned. Endpoint 110(1) and endpoint 110(2) may be located on the same hardware device or on respective hardware devices.

Persistent storage 130 may include any suitable memory (e.g., cache, database, etc.). Persistent storage 130 may be located on the same hardware device as endpoint 110(1) and/or endpoint 110(2), or on a different hardware device. System 100 may include any suitable application, solution, or architecture requiring a connection between two endpoints. This may include a fourth generation (4G) or fifth generation (5G) mobile network architecture in which a RAN node establishes an SCTP connection with a PCGW node.

In one example, endpoint 110(1) may establish a network session (e.g., SCTP association) between endpoint 110(1) and endpoint 120 based on a connection-oriented protocol, as represented by line 140. Endpoint 120 may initiate the network session with endpoint 110(1) and, after the network session is established, endpoint 110(1) and endpoint 120 may exchange data over the network session. At some point, the network session can be disrupted; for example, endpoint 110(1) may fail.

In conventional approaches, when an initial network session between endpoints is disrupted, the amount of time required to establish a subsequent network session between endpoints is typically non-deterministic—meaning the amount of time until the subsequent network session is established is unknown.

Consider a conventional example of a network session between a server process and a client. If the server process fails, the system could switch over to a standby server process. For the standby server process to connect to the client under conventional approaches, two options are available: one, perform a Stateful Switchover (SSO) of the network session; or two, wait for the client to detect the disruption (e.g., transport failure) and then attempt to re-connect/re-associate.

The first conventional option is a nonstarter because SSO typically requires synchronization of sequence numbers (e.g., Transmission Sequence Number (TSN) in SCTP). This poses significant challenges as even a single missed sequence number would cause synchronization to fail. And for SCTP, SSO would need to occur for each of the associations and streams. As a result, the first option would involve overly complex and unreliable mechanisms for migrating or failing-over the connection.

The second conventional option is generally how existing systems cause the client to connect with the standby server process. Typically, after the server process fails, the client—not knowing that the server process has failed—would send a message to the virtual Internet Protocol (IP) address of the failed server process. The message could be a stray packet that belongs to active/impending signaling traffic or a heartbeat/keep-alive/etc. message (hereinafter referred to as a "heartbeat message").

The standby server process, which has inherited the virtual IP address of the failed server process, would receive the message. In response to receiving the message, the standby server process would respond with an indication that the standby server process does not have context for the network session that was previously established between the failed server process and the client. After receiving the indication, the client would initiate the process to establish a new network session with the standby server process. For example, the client might initiate an SCTP four-way handshake with the standby server process.

One problem with this approach is that the time from when the network session disruption occurs to when the client sends the message to the standby server process is non-deterministic. There is no guarantee that the client would send a signaling message in a reasonable amount of time, and even clients configured for heartbeat messages could take an inordinate amount of time to register that the server process has failed. As a result, the client could take a minute or longer to initiate establishment of a new network session with the standby server process. The exact amount of time would vary depending on the configuration of the client and is thus non-deterministic. Further, some clients might not be configured for heartbeat messages and might also not have any signaling traffic to send to the standby server process (e.g., the client may be "idle" from a signaling messaging standpoint). In that case, the client could take even longer to initiate establishment of a new network session.

Conventionally, the standby server process would wait for a message from the client instead of initiating the new network session itself. While the standby server process might, after switchover, observe a drop in the number (count) of connected/associated clients, the standby server process would be unable to determine whether there is a reconnection issue or if the client simply has not yet attempted to reconnect. As a result, conventional techniques are client-controlled; otherwise, the standby server process could cause post-switchover audits to fail and trigger false alarms.

In sum, conventional approaches for establishing new network sessions between endpoints are unpredictably timed and rarely quick. Accordingly, to provide fast, deterministic recovery for endpoint 120, proactive disruption indication logic 150(1) and proactive disruption indication logic 150(2) are provided on endpoint 110(1) and endpoint 110(2), respectively. Briefly, proactive disruption indication logic 150(1) and proactive disruption indication logic 150(2) may enable endpoint 110(1) or endpoint 110(2) to provide, to endpoint 120, a proactive indication that the network session between endpoint 110(1) and endpoint 120 has failed. The proactive indication may prompt endpoint 120 to perform a fast reconnection with endpoint 110(1) or endpoint 110(2).

In one example, after establishing the network session between endpoint 110(1) and endpoint 120, endpoint 110(1) may store (e.g., persistently cache/transfer), in persistent storage 130, one or more network attributes 160 associated with the network session (as represented by line 170). Network attributes 160 may include any suitable information that permit endpoint 110(1) to communicate with endpoint 120 over the network session. For example, network attributes 160 may uniquely identify the network session. In one instance, network attributes 160 may include verification data configured to enable endpoint 120 to verify one or more network communications of the network session. The verification data may include a verification tag in the case of SCTP. Network attributes 160 may also/alternatively include an address (e.g., an IP address) and/or port of endpoint 120.

At some point, the network session may be disrupted; for example, endpoint 110(1) may fail. But because persistent storage 130 is "persistent," network attributes 160 may remain stored in persistent storage 130 even if endpoint 110(1) fails. As a result, network attributes 160 may be used to provide a proactive indication that the network session between endpoint 110(1) and endpoint 120 has failed. For example, endpoint 110(1) or endpoint 110(2) may include the verification data in the proactive indication, and may send the proactive indication to the address and port of endpoint 120. Endpoint 110(1) or endpoint 110(2) may send the proactive indication deterministically and faster than a conventional indication. The proactive indication may include an abort message for SCTP.

In one example, if endpoint 110(1) restarts after failing, endpoint 110(1) may obtain (e.g., fetch, receive, etc.) network attributes 160 from persistent storage 130, as further represented by line 170. Based on network attributes 160, endpoint 110(1) may provide, to endpoint 120, a proactive indication that the network session has been disrupted, as further represented by line 140.

In another example, endpoint 110(2) may obtain network attributes 160 from persistent storage 130, as represented by line 180. In this example, persistent storage 130 may be located on or near endpoint 110(2). Based on network attributes 160, endpoint 110(2) may provide, to endpoint 120, a proactive indication that the network session has been disrupted (as represented by line 190).

Thus, endpoint 110(1) or endpoint 110(2) may initiate and reliably send, to endpoint 120, an indication that endpoint 110(1) does not have context for the previous network session. However, it will be appreciated that any suitable entity that is responsible for fast recovery of the network session may provide the proactive indication to endpoint 120. The entity may include endpoint 110(1), endpoint 110(2), a manager process, etc. The entity may provide the proactive indication via any suitable retry mechanism.

In response to receiving the proactive indication, endpoint 120 may provide, to endpoint 110(1) or endpoint 110(2), a request to establish a subsequent network session with endpoint 110(1) or endpoint 110(2) based on the connection-oriented protocol. Endpoint 110(1) or endpoint 110(2) may obtain the request, and, in response to the request, establish the subsequent network session based on the connection-oriented protocol.

Unlike typical client-server connection-oriented communication models—in which the client is responsible for detecting/discovering a disruption in the connection (e.g., connection loss) and subsequently performing a reconnection—techniques presented herein may be dictated by endpoint 110(1) and/or endpoint 110(2). That is, a fast reconnection/recovery may be triggered from the server-side. Whereas conventional approaches usually have a delay until either the heartbeat or keep-alive timeout happens or there is an inherent error response/transaction to detect the connection failure at the client end, these techniques may result in a fast and deterministic detection/discovery of connection failure at endpoint 120. Thus, these techniques may enable endpoint 120 to quickly detect a failure and perform a fresh reconnection.

Figure 2:
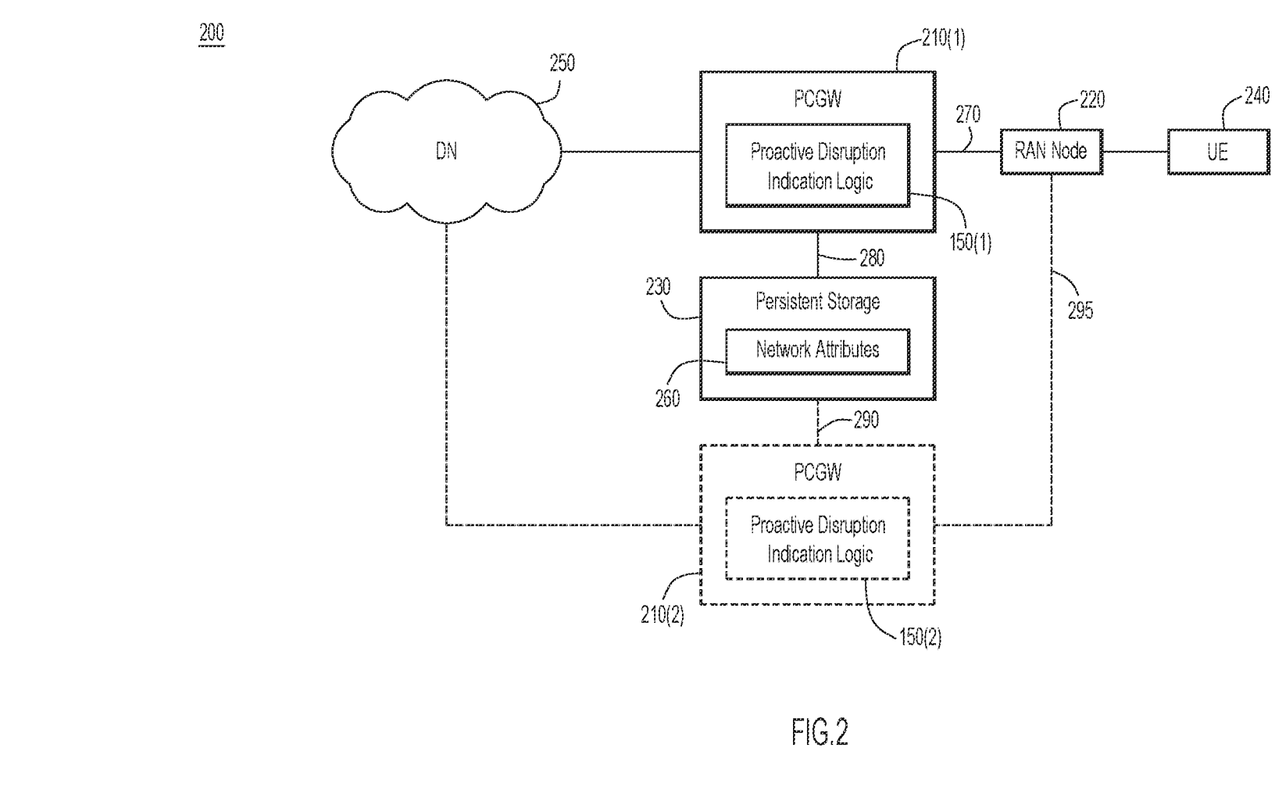
FIG. 2 illustrates a system configured to provide a proactive indication of a disruption of a network session between a Packet Core Gateway (PCGW) and a Radio Access Network (RAN) node, according to an example embodiment.

FIG. 2 illustrates an example system 200 configured to provide a proactive indication of a disruption of an SCTP association in a 5G use case for SCTP. System 200 includes PCGW 210(1) and, optionally, PCGW 210(2). System 200 further includes RAN node 220 and persistent storage 230. System 200 further includes UE 240 and Data Network (DN) 250.

PCGW 210(1) and PCGW 220(2) may be specific examples of endpoints 110(1) and endpoint 110(2), respectively (FIG. 1). For example, PCGW 210(1) and 210(2) may be respective server processes. PCGW 210(1) and 210(2) may include any suitable 5G component, such as an Access and Mobility Management Function (AMF), a Session Management Function (SMF), etc.

RAN node 220 may be a specific example of endpoint 120 (FIG. 1). For example, RAN node 220 may be a client. In one instance, RAN node 220 may be a cellular Access Point (AP) that terminates a cellular (e.g., 5G New Radio (NR)) air interface. RAN node 220 may be configured with appropriate hardware (e.g., processor(s), memory element(s), antennas and/or antenna arrays, baseband processors (modems), and/or the like), software, logic, and/or the like to provide over-the-air coverage for a cellular access network. In various embodiments, RAN node 220 may be implemented as a next generation Node B (gNB) to facilitate 5G NR air accesses.

UE 240 may be associated with any suitable device configured to initiate a flow in system 200. For example, UE 240 may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an Internet Protocol (IP) phone, and/or any other device and/or combination of devices, components, elements, and/or objects capable of initiating voice, audio, video, media, or data exchanges within system 200. UE 240 may also include any suitable interface to a human user such as a microphone, a display, a keyboard, or other terminal equipment. UE 240 may also be any device that seeks to initiate a communication on behalf of another entity or element such as a program, a database, or any other component, device, element, or object capable of initiating an exchange within system 200. UE 240 may be configured with appropriate hardware (e.g., processor(s), memory element(s), antennas and/or antenna arrays, baseband processors (modems), and/ or the like), software, logic, and/or the like to facilitate respective over-the-air (air) interfaces for accessing/connecting to RAN node 220. It will be appreciated that any number of UEs may be present in system 200.

In various embodiments, DN 250 may be any combination of the Internet, an IP Multimedia Subsystem (IMS), Ethernet network, Ethernet switching system(s), and/or the like. DN 250 may facilitate user plane (e.g., user data/data transfer) connectivity for per-access UE sessions. For example, UE 240 may access various services, applications, etc. from DN 250.

System 200 may enable server-initiated (e.g., PCGW-initiated) fast SCTP recovery in a 5G packet core. In one example, PCGW 210(1) may be an active server process and may establish an SCTP association between PCGW 210(1) and RAN node 220, as represented by line 270. RAN node 220 may initiate the network session with PCGW 210(1). RAN node 220 may connect to multiple PCGWs simultaneously via multiple SCTP associations.

PCGW 210(1) may store (e.g., persistently cache/transfer), in persistent storage 230, one or more network attributes 260 (as represented by line 280). Network attributes 260 may be associated with the SCTP association. For example, network attributes 260 may uniquely identify the SCTP association, and may include SCTP association identifier parameters. Network attributes 260 may include any suitable information that permit PCGW 210(1) to communicate with RAN node 220 over the network session. For example, network attributes 260 may include a verification tag, an IP address (e.g., a peer IP address), and/or a port of RAN node 220.

At some point, the SCTP association may be disrupted; for example, PCGW 210(1) may fail. Because persistent storage 230 is "persistent," network attributes 260 may remain stored in persistent storage 230 even if PCGW 210(1) fails.

In one example, if PCGW 210(1) restarts after failing, PCGW 210(1) may obtain network attributes 260 from persistent storage 230, as further represented by line 280. Based on network attributes 260, PCGW 210(1) may provide, to RAN node 220, a proactive indication that the network session has been disrupted, as further represented by line 270. For example, PCGW 210(1) may proactively and reliably send an abort message to all suitable cached SCTP associations using respective verification tags.

In another example, PCGW 210(2) may obtain network attributes 260 from persistent storage 230, as represented by line 290. In this example, PCGW 210(2) may be a respawned instance of PCGW 210(1), and persistent storage 230 may be located the same hardware device that hosts PCGW 210(2). Based on network attributes 260, PCGW 210(2) may provide, to RAN node 220, a proactive indication that the network session has been disrupted (as represented by line 295). For example, PCGW 210(2) may proactively and reliably send an abort message to all suitable cached SCTP associations using respective verification tags.

Any suitable entity that is responsible for fast recovery of the SCTP association may provide the proactive indication to RAN node 220. The entity may include PCGW 210(1), PCGW 210(2), a manager process, etc. The entity may provide the proactive indication via any suitable retry mechanism.

PCGW 210(1) or PCGW 210(2) may include the verification tag in the proactive indication, and may send the proactive indication to the IP address and port of RAN node 220. PCGW 210(1) or PCGW 210(2) may send the proactive indication deterministically and faster than a conventional indication.

These techniques may enable RAN node 220 to quickly detect a failure and perform a fresh reconnection. In one example, in response to receiving the proactive indication, RAN node 220 may provide, to PCGW 210(1) or PCGW 210(2), a request to establish a subsequent SCTP association with PCGW 210(1) or PCGW 210(2). PCGW 210(1) or PCGW 210(2) may obtain the request and, in response to the request, establish the SCTP association. Thus, in one example, a faster SCTP re-association may be triggered from the server-side.

PCGW 210(1) may accelerate recovery for RAN node 220 by persistently caching network attributes 260 outside PCGW 210(1). After a server process restart (e.g., of PCGW 210(1)) or switchover (e.g., to PCGW 210(2)), PCGW 210(1) or PCGW 210(2) may send a proactive abort message on all known SCTP associations based on network attributes 260. Instead of relying on the non-determinism inherent in RAN-side detection of the disruption, these techniques may enable deterministic PCGW-side detection of the disruption.

While system 200 relates a 5G use case, it will be appreciated that similar techniques may apply to 4G use cases as well. In the 4G use case, PCGW 210(1) and PCGW 210(2) may be replaced with respective Mobility Management Entities (MMEs), and RAN node 220 may terminate a 4G Long-Term Evolution (LTE) air interface. In various embodiments, RAN node 220 may be implemented as an evolved Node B (eNB) to facilitate 4G LTE air accesses.

Figure 3:
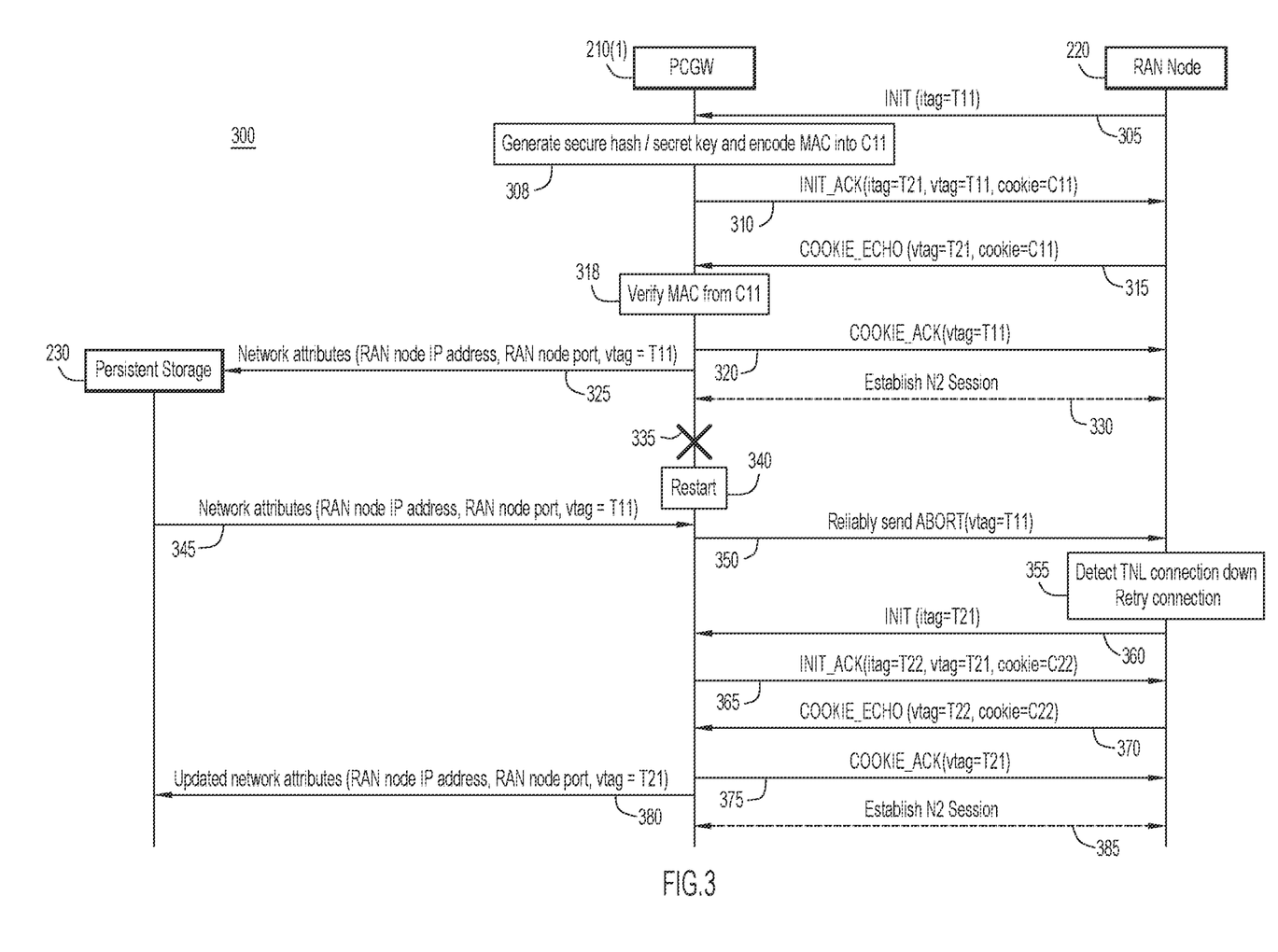
FIG. 3 illustrates a sequence diagram of a method for providing, by a PCGW, a proactive indication of a disruption of a network session between the PCGW and a RAN node, according to an example embodiment.
Figure 4:
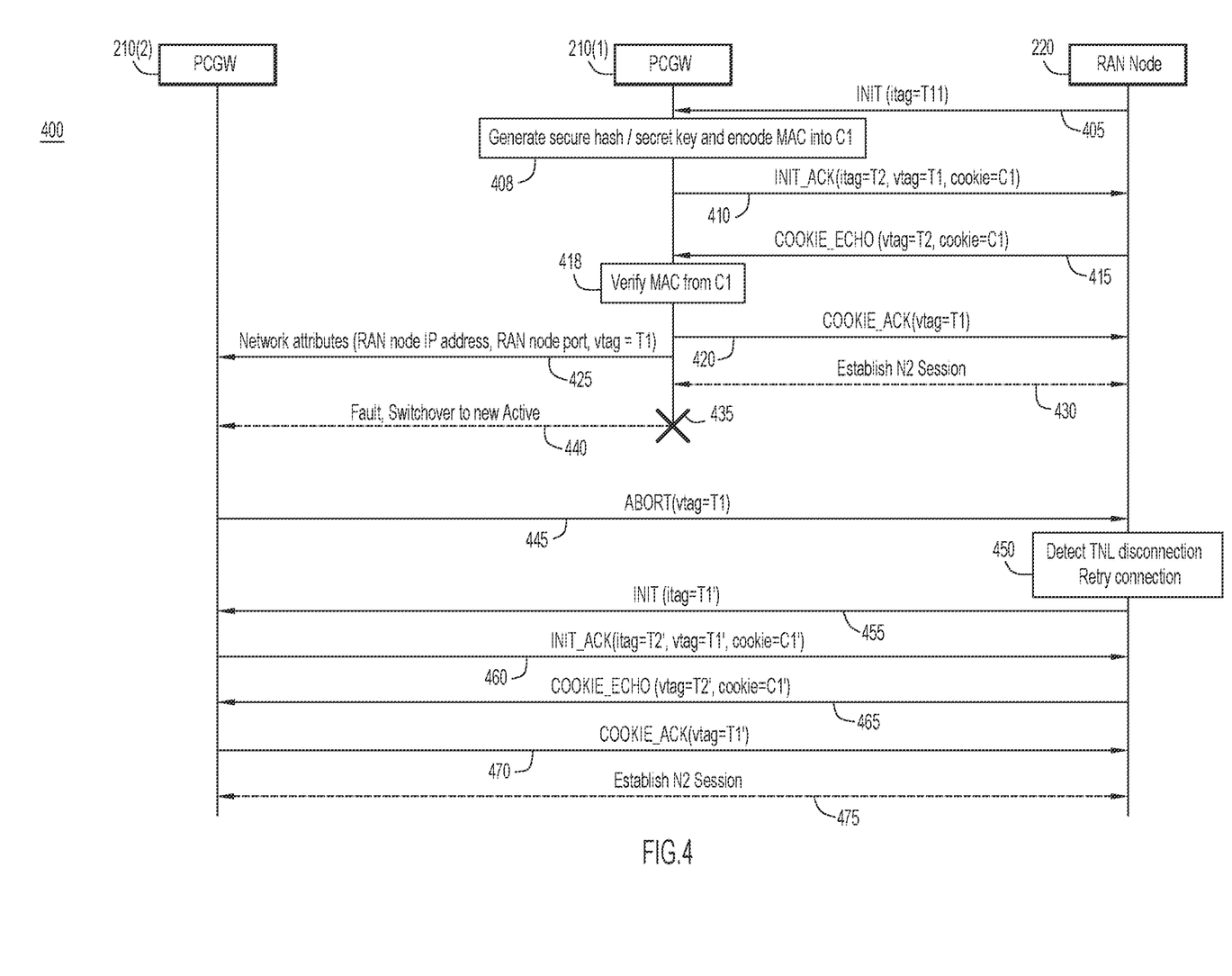
FIG. 4 illustrates a sequence diagram of a method for providing, by a PCGW, a proactive indication of a disruption of a network session between another PCGW and a RAN node, according to an example embodiment.

With continuing reference to FIG. 2, FIGS. 3 and 4 illustrates sequence diagrams of example methods 300 and 400 for providing a proactive indication of a disruption of a network session. Briefly, in method 300, the proactive indication may be provided to RAN node 220 by PCGW 210(1), whereas in method 400, the proactive indication may be provided to RAN node 220 by PCGW 210(2).

With reference first to FIG. 3, method 300 relates to a deployment scenario involving a server process restart of PCGW 210(1). In this example, PCGW 210(1) may be a standalone box that supports process restart functionality.

At operations 305-320, PCGW 210(1) may perform a four-way handshake to establish an SCTP association between PCGW 210(1) and RAN node 220. At operation 305, RAN node 220 may initiate establishment of the SCTP association to set up an N2 interface/session/connection between PCGW 210(1) and RAN node 220. In particular, PCGW 210(1) obtains, from RAN node 220, an INIT chunk that initiates establishment of the SCTP association. The INIT chunk may include an initiate tag ("itag") having a value of T11. PCGW 210(1) will include T11 in subsequent communications to RAN node 220 as a verification tag.

At operation 308, PCGW 210(1) may generate a secure hash/secret key and encode a Message Authentication Code (MAC) into a cookie C11. At operation 310, PCGW 210(1) provides, to RAN node 220, an INIT ACK chunk that acknowledges the INIT chunk. The INIT ACK chunk may include an initiate tag having a value of T21. RAN node 220 will include T21 in subsequent communications to PCGW 210(1) as a verification tag. PCGW 210(1) also includes T11 as the verification tag ("vtag") in the INIT ACK chunk. The INIT ACK chunk further includes a cookie having a value of C11 in the INIT ACK chunk.

At operation 315, PCGW 210(1) obtains, from RAN node 220, a COOKIE ECHO chunk. RAN node 220 includes T21 in the COOKIE ECHO chunk as a verification tag. The COOKIE ECHO chunk also includes a cookie having a value of C11 (i.e., the value of the cookie indicated in the INIT ACK chunk). That is, RAN node 220 may replay the cookie C11 back to PCGW 210(1).

At operation 318, PCGW 210(1) may verify the MAC from the cookie C11. PCGW 210(1) may be configured to send a COOKIE ACK chunk upon success, and an ABORT chunk upon failure. In this example, PCGW 210(1) successfully verifies the MAC from cookie C11. Therefore, at operation 320, PCGW 210(1) provides, to RAN node 220, a COOKIE ACK chunk. The COOKIE ACK chunk includes T11 as the verification tag. At this stage, the SCTP association has been established.

At operation 325, PCGW 210(1) stores, in persistent storage 230, one or more network attributes associated with the SCTP association. The network attributes may include SCTP association information such as an IP address of RAN node 220, a port of RAN node 220, and the value of the verification tag (T11). Communications sent to RAN node 220 as part of the SCTP association may include T11 as the verification tag, and may be sent to the stored IP address and port of RAN node 220.

At operation 330, PCGW 210(1) may establish an N2 session with RAN node 220. The N2 session may support one or more signaling protocols such as NG Application Protocol (NGAP) and/or Non-Access Stratum (NAS). The one or more signaling protocols may use SCTP as an underlying transport protocol.

At operation 335, PCGW 210(1) experiences a failure and as a result the SCTP association is disrupted. At operation 340, PCGW 210(1) restarts. At operation 345, PCGW 210(1) obtains (e.g., retrieves), from persistent storage 230, the one or more network attributes including the IP address of RAN node 220, the port of RAN node 220, and the value of the verification tag (T11).

At operation 350, PCGW 210(1) provides, to RAN node 220, a proactive indication that the SCTP association has been disrupted based on the one or more network attributes. In particular, PCGW 210(1) sends an ABORT chunk that includes T11 as the verification tag. In one example, PCGW 210(1) may iterate over all SCTP associations and send out a proactive ABORT chunk using the same verification tag that was previously used.

At operation 355, RAN node 220 detects that the Transport Network Layer (TNL)/SCTP connection is down after receiving the ABORT chunk from PCGW 201(1) with T11 and determines that RAN node 220 should retry the SCTP association. If the ABORT chunk did not include T11, RAN node 220 might disregard the ABORT chunk. Instead, by including T11 in the ABORT chunk, PCGW 210(1) may enable faster SCTP recovery.

At operations 360-375, PCGW 210(1) may perform a four-way handshake to establish a subsequent SCTP association between PCGW 210(1) and RAN node 220. More specifically, in response to receiving the ABORT chunk, RAN node 220 may consider performing a connection drop and perform a reconnection to establish a fresh N2 session.

At operation 360, PCGW 210(1) obtains, from RAN node 220, an INIT chunk that initiates establishment of the subsequent SCTP association. The INIT chunk may include an initiate tag having a value of T21. PCGW 210(1) will include T21 in subsequent communications to RAN node 220 as a verification tag. RAN node 220 may initiate establishment of the subsequent SCTP association to set up an N2 interface between PCGW 210(1) and RAN node 220.

At operation 365, PCGW 210(1) provides, to RAN node 220, an INIT ACK chunk that acknowledges the INIT chunk. The INIT ACK chunk may include an initiate tag having a value of T22. RAN node 220 will include T22 in subsequent communications to PCGW 210(1) as a verification tag. PCGW 210(1) also includes T21 as the verification tag in the INIT ACK chunk. The INIT ACK chunk further includes a cookie having a value of C22 in the INIT ACK chunk.

At operation 370, PCGW 210(1) obtains, from RAN node 220, a COOKIE ECHO chunk. RAN node 220 includes T22 in the COOKIE ECHO chunk as a verification tag. The COOKIE ECHO chunk also includes a cookie having a value of C22 (i.e., the value of the cookie indicated in the INIT ACK chunk). At operation 375, PCGW 210(1) provides, to RAN node 220, a COOKIE ACK chunk. The COOKIE ACK chunk includes T21 as the verification tag. At this stage, the subsequent SCTP association has been established.

At operation 380, PCGW 210(1) stores, in persistent storage 230, one or more updated network attributes associated with the subsequent SCTP association. The updated network attributes may include updated SCTP association information such as an IP address of RAN node 220, a port of RAN node 220, and the value of the verification tag (T21). Communications sent to RAN node 220 as part of the subsequent SCTP association may include T21 as the verification tag, and may be sent to the stored IP address and port of RAN node 220.

At operation 385, PCGW 210(1) may establish a subsequent N2 session. The subsequent N2 session may support one or more signaling protocols such as NGAP and/or NAS. The one or more signaling protocols may use SCTP as an underlying transport protocol.

While method 300 relates a 5G use case, it will be appreciated that similar techniques may apply to 4G use cases as well. In the 4G use case, the N2 session may be replaced with an S2 session, and NGAP may be replaced with S1 Application Protocol (S1AP). Other embodiments may be envisioned.

In the example of FIG. 4, method 400 relates to a deployment scenario involving a remote chassis High-Availability (HA) switchover from PCGW 210(1) to PCGW 210(2). It will be appreciated that similar techniques may be applied to switchovers from one controller card to another controller card on the same chassis. In the example of FIG. 4, PCGW 210(1) may be an active server process and PCGW 210(2) may be a hot standby server process. Thus, PCGW 210(1) and PCGW 210(2) may be a one-to-one HA pair in active-standby mode.

At operations 405-420, PCGW 210(1) may perform a four-way handshake to establish an SCTP association between PCGW 210(1) and RAN node 220. At operation 405, PCGW 210(1) obtains, from RAN node 220, an INIT chunk that initiates establishment of the SCTP association. The INIT chunk may include an initiate tag having a value of T1. PCGW 210(1) will include T1 in subsequent communications to RAN node 220 as a verification tag. RAN node 220 may initiate establishment of the SCTP association to set up an N2 interface between PCGW 210(1) and RAN node 220.

At operation 408, PCGW 210(1) may generate a secure hash/secret key and encode a MAC into a cookie C1. At operation 410, PCGW 210(1) provides, to RAN node 220, an INIT ACK chunk that acknowledges the INIT chunk. The INIT ACK chunk may include an initiate tag having a value of T2. RAN node 220 will include T2 in subsequent communications to PCGW 210(1) as a verification tag. PCGW 210(1) also includes T1 as the verification tag in the INIT ACK chunk. The INIT ACK chunk further includes a cookie having a value of C1 in the INIT ACK chunk.

At operation 415, PCGW 210(1) obtains, from RAN node 220, a COOKIE ECHO chunk. RAN node 220 includes T2 in the COOKIE ECHO chunk as a verification tag. The COOKIE ECHO chunk also includes a cookie having a value of C1 (i.e., the value of the cookie indicated in the INIT ACK chunk). That is, RAN node 220 may replay the cookie C1 back to PCGW 210(1).

At operation 418, PCGW 210(1) may verify the MAC from the cookie C1. PCGW 210(1) may be configured to send a COOKIE ACK chunk upon success, and an ABORT chunk upon failure. In this example, PCGW 210(1) successfully verifies the MAC from cookie C1. Therefore, at operation 420, PCGW 210(1) provides, to RAN node 220, a COOKIE ACK chunk. The COOKIE ACK chunk includes T1 as the verification tag. At this stage, the SCTP association has been established.

At operation 425, PCGW 210(1) stores, in persistent storage 230, one or more network attributes associated with the SCTP association. In this example, persistent storage 230 may be co-located with PCGW 210(2). Thus, PCGW 210(1) may collect the network attributes from the SCTP association and synchronize with PCGW 210(2).

The network attributes may include SCTP association information such as an IP address of RAN node 220, a port of RAN node 220, and the value of the verification tag (T1). Communications sent to RAN node 220 as part of the SCTP association may include T1 as the verification tag, and may be sent to the stored IP address and port of RAN node 220.

At operation 430, PCGW 210(1) may establish an N2 session with RAN node 220. The N2 session may support one or more signaling protocols such as NGAP and/or NAS. The one or more signaling protocols may use SCTP as an underlying transport protocol.

At operation 435, PCGW 210(1) encounters a switchover event (e.g., a failure) and as a result the SCTP association is disrupted. At operation 440, an HA switchover occurs from PCGW 210(1) to PCGW 210(2), and PCGW 210(2) becomes the new active. PCGW 210(2) may obtain (e.g., retrieve), from persistent storage 230, the one or more network attributes including the IP address of RAN node 220, the port of RAN node 220, and the value of the verification tag (T1).

At operation 445, PCGW 210(2) provides, to RAN node 220, a proactive indication that the SCTP association has been disrupted based on the one or more network attributes. In particular, PCGW 210(2) sends an ABORT chunk that includes T1 as the verification tag. In one example, PCGW 210(2) may iterate over all SCTP associations and send out a proactive ABORT chunk using the same verification tag that was previously used.

At operation 450, RAN node 220 detects that the TNL connection (SCTP association) is down and determines that RAN node 220 should retry the SCTP association. If the ABORT chunk did not include T11, RAN node 220 might disregard the ABORT chunk. Instead, by including T1 in the ABORT chunk, PCGW 210(2) may enable faster SCTP recovery after HA switchover.

At operations 455-470, PCGW 210(2) may perform a four-way handshake to establish a subsequent SCTP association between PCGW 210(2) and RAN node 220. More specifically, in response to receiving the ABORT chunk, RAN node 220 may consider performing a connection drop and perform a reconnection to establish a fresh N2 session.

At operation 455, PCGW 210(2) obtains, from RAN node 220, an INIT chunk that initiates establishment of the subsequent SCTP association. The INIT chunk may include an initiate tag having a value of T1'. PCGW 210(2) will include T1' in subsequent communications to RAN node 220 as a verification tag. RAN node 220 may initiate establishment of the subsequent SCTP association to set up an N2 interface between PCGW 210(2) and RAN node 220.

At operation 460, PCGW 210(2) provides, to RAN node 220, an INIT ACK chunk that acknowledges the INIT chunk. The INIT ACK chunk may include an initiate tag having a value of T2'. RAN node 220 will include T2' in subsequent communications to PCGW 210(2) as a verification tag. PCGW 210(2) also includes T1' as the verification tag in the INIT ACK chunk. The INIT ACK chunk further includes a cookie having a value of C1' in the INIT ACK chunk.

At operation 465, PCGW 210(2) obtains, from RAN node 220, a COOKIE ECHO chunk. RAN node 220 includes T2' in the COOKIE ECHO chunk as a verification tag. The COOKIE ECHO chunk also includes a cookie having a value of C1' (i.e., the value of the cookie indicated in the INIT ACK chunk). At operation 470, PCGW 210(2) provides, to RAN node 220, a COOKIE ACK chunk. The COOKIE ACK chunk includes T1' as the verification tag. At this stage, the subsequent SCTP association has been established.

Optionally, PCGW 210(2) may store, in persistent storage, one or more updated network attributes associated with the subsequent SCTP association. The persistent storage may be persistent storage 230 or another persistent storage. The updated network attributes may include updated SCTP association information such as an IP address of RAN node 220, a port of RAN node 220, and the value of the verification tag (T1'). Communications sent to RAN node 220 as part of the subsequent SCTP association may include T1' as the verification tag, and may be sent to the stored IP address and port of RAN node 220.

At operation 475, PCGW 210(2) may establish a subsequent N2 session. The subsequent N2 session may support one or more signaling protocols such as NGAP and/or NAS. The one or more signaling protocols may use SCTP as an underlying transport protocol.

While method 400 relates a 5G use case, it will be appreciated that similar techniques may apply to 4G use cases as well. In the 4G use case, the N2 session may be replaced with an S2 session, and NGAP may be replaced with S1AP. Other embodiments may be envisioned.

Figure 5:
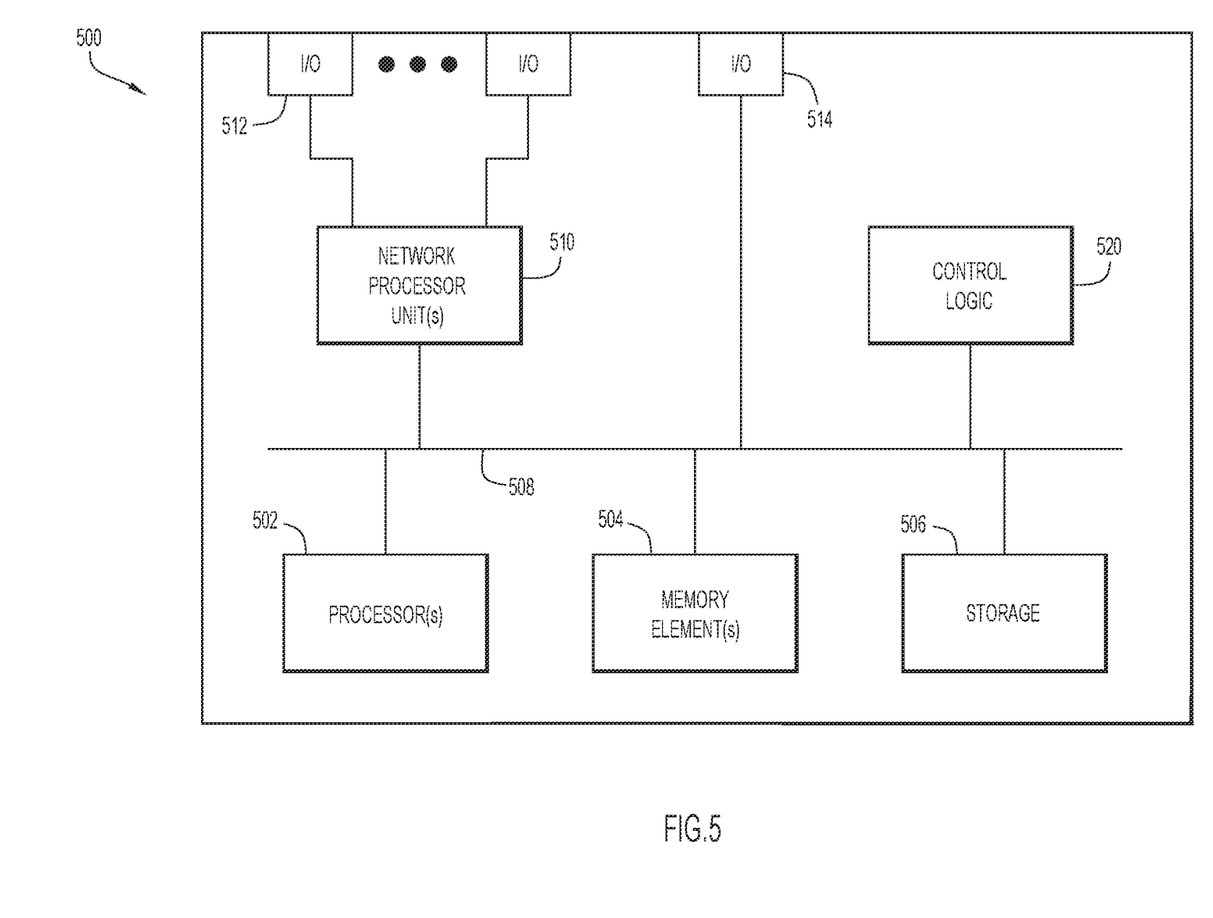
FIG. 5 illustrates a hardware block diagram of a computing device configured to perform functions associated with operations discussed herein, according to an example embodiment.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506.

Note that in some embodiments, storage 506 can be consolidated with memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interfaces 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device 500; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory elements 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 500 for transfer onto another computer readable storage medium.

Figure 6:
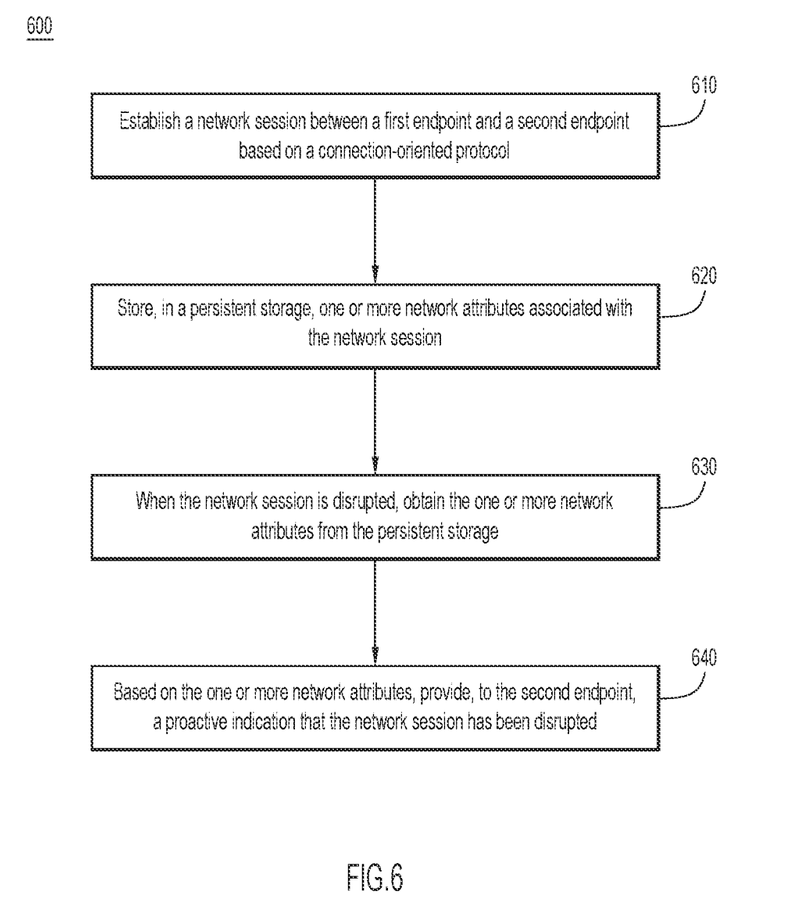
FIG. 6 illustrates a flowchart of a method for performing functions associated with operations discussed herein, according to an example embodiment.

FIG. 6 is a flowchart of an example method 600 for performing functions associated with operations discussed herein. Method 600 may be performed by any suitable entity, such as endpoint 110(1) and/or endpoint 110(2). At operation 610, a network session is established between a first endpoint and a second endpoint based on a connection-oriented protocol. At operation 620, one or more network attributes associated with the network session are stored in a persistent storage. At operation 630, the one or more network attributes may be obtained from the persistent storage when the network session is disrupted. At operation 640, a proactive indication that the network session has been disrupted may be provided to the second endpoint based on the one or more network attributes.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: establishing a network session between a first endpoint and a second endpoint based on a connection-oriented protocol; storing, in a persistent storage, one or more network attributes associated with the network session; when the network session is disrupted, obtaining the one or more network attributes from the persistent storage; and based on the one or more network attributes, providing, to the second endpoint, a proactive indication that the network session has been disrupted.

In one example, the obtaining and the providing occur at the first endpoint.

In one example, the obtaining and the providing occur at a third endpoint.

In one example, the method further comprises: obtaining, from the second endpoint in response to the proactive indication, a request to establish a subsequent network session with the second endpoint based on the connection-oriented protocol; and in response to the request, establishing the subsequent network session based on the connection-oriented protocol.

In one example, the one or more network attributes include verification data configured to enable the second endpoint to verify one or more network communications of the network session. In a further example, the verification data includes a verification tag provided by the second endpoint for inclusion in the one or more network communications. In one example, the verification data (e.g., the verification tag) may be included in the proactive indication.

In one example, the one or more network attributes include an address of the second endpoint.

In one example, the one or more network attributes include a port of the second endpoint.

In one example, the connection-oriented protocol is a stream control transmission protocol.

In one example, the first endpoint is a server process and the second endpoint is a client. In a further example, the server process is a packet core gateway and the client is a radio access network node. In a still further example, the packet core gateway includes an access and mobility management function and a session management function.

In another form, an apparatus is provided. The apparatus comprises: a network interface configured to obtain or provide network communications; and one or more processors coupled to the network interface, wherein the one or more processors are configured to: establish a network session between the apparatus and an endpoint based on a connection-oriented protocol; and store, in a persistent storage, one or more network attributes associated with the network session, wherein: when the network session is disrupted, the one or more network attributes are obtained from the persistent storage; and based on the one or more network attributes, a proactive indication that the network session has been disrupted is provided to the endpoint.

In another form, one or more non-transitory computer readable storage media are provided. The non-transitory computer readable storage media are encoded with instructions that, when executed by one or more processors, cause the one or more processors to: establish a network session between a first endpoint and a second endpoint based on a connection-oriented protocol; store, in a persistent storage, one or more network attributes associated with the network session; when the network session is disrupted, obtain the one or more network attributes from the persistent storage; and based on the one or more network attributes, provide, to the second endpoint, a proactive indication that the network session has been disrupted.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   establishing a network session between a first endpoint and a second endpoint based on a connection-oriented protocol;
   storing, in a persistent storage, one or more network attributes associated with the network session, wherein the one or more network attributes include a verification tag;
   when the network session is disrupted as a result of a failure of the first endpoint, obtaining the one or more network attributes from the persistent storage; and
   based on the one or more network attributes, providing, to the second endpoint, a proactive indication that the network session has been disrupted, wherein the proactive indication is an abort chunk that includes the verification tag in which the verification tag is configured to enable the second endpoint to verify one or more network communications of the network session.

2. The method of claim 1, wherein the obtaining and the providing occur at the first endpoint after a restart of the first endpoint, wherein the first endpoint is a packet core gateway.

3. The method of claim 1, wherein the obtaining and the providing occur at a third endpoint, wherein the third endpoint is a packet core gateway.

4. The method of claim 1, further comprising:
   obtaining, from the second endpoint in response to the proactive indication, a request to establish a subsequent network session with the second endpoint based on the connection-oriented protocol; and
   in response to the request, establishing the subsequent network session based on the connection-oriented protocol.

5. The method of claim 1, wherein the verification tag obtained from the second endpoint for inclusion in the one or more network communications.

6. The method of claim 1, wherein the one or more network attributes further include at least one of an address of the second endpoint or a port of the second endpoint.

7. The method of claim 1, wherein the connection-oriented protocol is a stream control transmission protocol.

8. The method of claim 1, wherein the first endpoint is a packet core gateway.

9. The method of claim 8, wherein the packet core gateway includes an access and mobility management function and a session management function.

10. An apparatus comprising:
    a network interface configured to obtain or provide network communications; and
    one or more processors coupled to the network interface, wherein the one or more processors are configured to:
    establish a network session between the apparatus and an endpoint based on a connection-oriented protocol; and
    store, in a persistent storage, one or more network attributes associated with the network session, wherein the one or more network attributes include a verification tag and wherein:
    when the network session is disrupted as a result of a failure of the apparatus, the one or more network attributes are obtained from the persistent storage; and
    based on the one or more network attributes, a proactive indication that the network session has been disrupted is provided to the endpoint, wherein the proactive indication is an abort chunk that includes the verification tag in which the verification tag is configured to enable the endpoint to verify one or more network communications of the network session.

11. The apparatus of claim 10, wherein the one or more processors are configured to:
    obtain the one or more network attributes after a restart of the apparatus, wherein the apparatus is a packet core gateway; and
    provide the proactive indication to the endpoint.

12. A system comprising the apparatus of claim 10 and another apparatus, wherein the another apparatus is a packet core gateway configured to:
    obtain the one or more network attributes; and
    provide the proactive indication to the endpoint.

13. The apparatus of claim 10, wherein the one or more network attributes further include at least one of an address of the endpoint and a port of the endpoint.

14. One or more non-transitory computer readable storage media encoded with instructions that, when executed by one or more processors, cause the one or more processors to:
    establish a network session between a first endpoint and a second endpoint based on a connection-oriented protocol;
    store, in a persistent storage, one or more network attributes associated with the network session, wherein the one or more network attributes include a verification tag;
    when the network session is disrupted as a result of a failure of the first endpoint, obtain the one or more network attributes from the persistent storage; and
    based on the one or more network attributes, provide, to the second endpoint, a proactive indication that the network session has been disrupted, wherein the proactive indication is an abort chunk that includes the verification tag in which the verification tag is configured to enable the second endpoint to verify one or more network communications of the network session.

15. The one or more non-transitory computer readable storage media of claim 14, wherein the first endpoint is configured to obtain the one or more network attributes and provide the proactive indication to the second endpoint after a restart of the first endpoint and the first endpoint is a packet core gateway.

16. The one or more non-transitory computer readable storage media of claim 14, wherein a third endpoint is configured to obtain the one or more network attributes and provide the proactive indication to the second endpoint and the third endpoint is a packet core gateway.

17. The one or more non-transitory computer readable storage media of claim 14, wherein the one or more network attributes further include at least one of an address of the second endpoint and a port of the second endpoint.

18. The method of claim 1, wherein the verification tag being included in the abort chunk causes the second endpoint to not disregard the abort chunk and to request a subsequent network session based on the connection-oriented protocol.

19. The method of claim 18, wherein a subsequent verification tag is obtained from the second endpoint for the subsequent network session.

20. The one or more non-transitory computer readable storage media of claim 14, wherein the verification tag is obtained from the second endpoint.

* * * * *